United States Patent

[11] 3,591,918

| [72] | Inventors | Jean-Andre Bernard<br>Barga;<br>Adamo-Renato Faraoni, Ranco, both of,<br>Italy |
|---|---|---|
| [21] | Appl. No. | 719,066 |
| [22] | Filed | Apr. 5, 1968 |
| [45] | Patented | July 13, 1971 |
| [73] | Assignee | European Atomic Energy Community<br>Euratom, Brussels, Belgium |
| [32] | Priority | Apr. 19, 1967 |
| [33] | | Belgium |
| [31] | | 42549 |

[54] METHOD OF PRODUCING A SEALING TIGHT JOINT BETWEEN TWO TUBES MADE OF DIFFERENT MATERIALS, AND JOINT PRODUCED BY THE METHOD
4 Claims, 1 Drawing Fig.

[52] U.S. Cl. ..................................................... 29/516, 29/523
[51] Int. Cl. ............................................. B21d 39/04, B23p 11/02, B23p 19/04
[50] Field of Search ............................................. 29/516, 523

[56] References Cited
UNITED STATES PATENTS

| 3,461,523 | 8/1969 | Peehs | 29/25.13 |
| 3,496,628 | 2/1970 | Davis | 29/455 |
| 1,179,853 | 4/1916 | McCulloch | 29/516 X |
| 1,703,037 | 2/1929 | Heck | 29/516 X |
| 1,856,581 | 5/1932 | Mitchell | 29/523 X |
| 2,545,527 | 3/1951 | Maxwell | 29/523 X |
| 2,857,666 | 10/1958 | Beyer | 29/523 X |
| 2,958,127 | 11/1960 | Johnson | 29/523 |
| 3,018,547 | 1/1962 | Marskell | 29/523 X |
| 3,112,564 | 12/1963 | Murray | 29/523 X |
| 3,352,003 | 11/1967 | Murtha | 29/523 X |
| 3,413,021 | 11/1968 | Potts | 29/523 X |
| 3,434,194 | 3/1969 | Whittaker | 29/523 X |

Primary Examiner—Wayne A. Morse, Jr.
Attorney—Stevens, Davis, Miller & Mosher

ABSTRACT: A method of producing a sealing tight joint between two tubes one of which has a greater wall thickness than the other. The thinner tube has a collar formed on it which will engage a circumferential groove in the end of the thicker tube when placed in end-to-end relationship. A sleeve is slid over the two tubes, this sleeve having an inwardly extending flange which engages the collar and holds it near the end of the thicker tube. After welding the collar in place, the thicker tube is worked so as to expand it axially so that the grooved end tightly engages the collar.

PATENTED JUL 13 1971
3,591,918
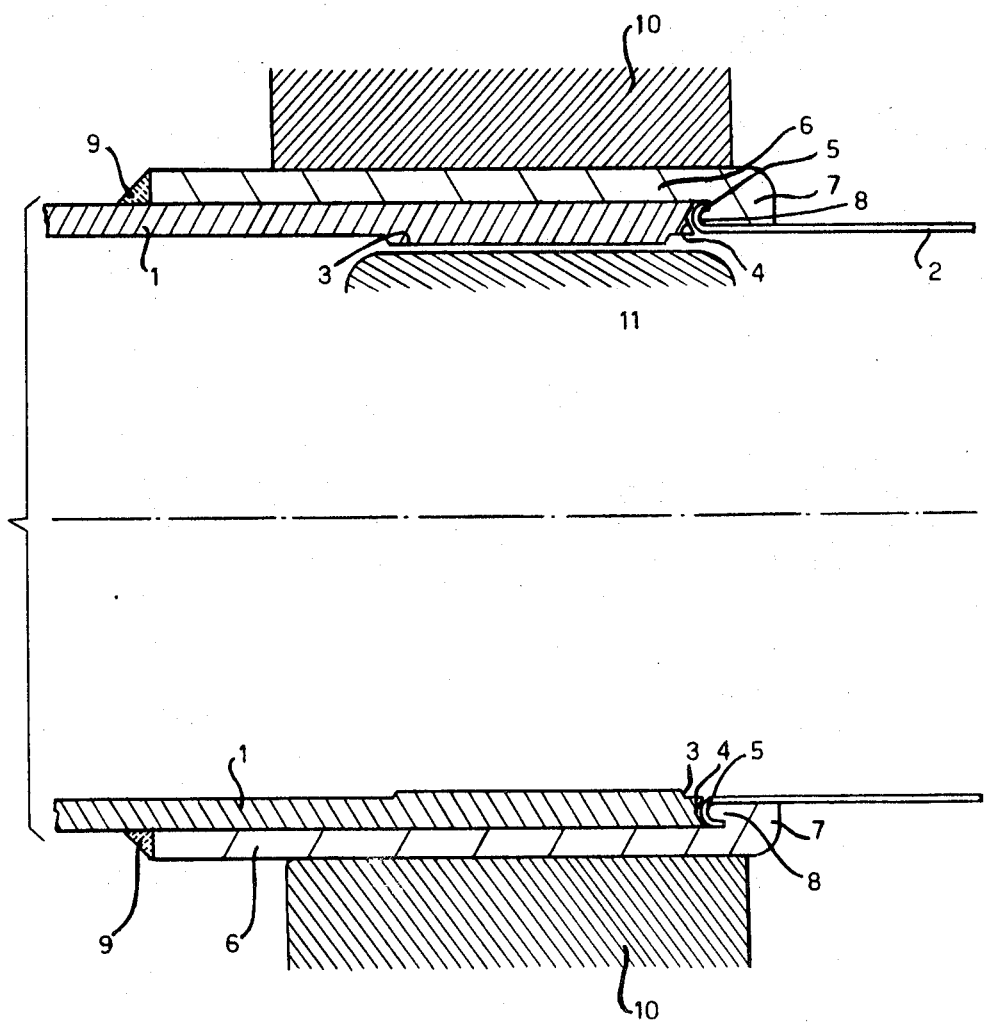
INVENTOR
BY

METHOD OF PRODUCING A SEALING TIGHT JOINT BETWEEN TWO TUBES MADE OF DIFFERENT MATERIALS, AND JOINT PRODUCED BY THE METHOD

The invention relates to a method of making a joint between two tubes (e.g. made of different materials) one of them having walls thinner than the other and to joints made by the method. The joint may, for example, be used in the primary circuit of a nuclear reactor where tightness against leakage under pressure and thermal changes is important. The invention is not however in any way limited to this particular field of application.

For the above purpose it is desirable that the sealing tightness is not lower than $10^{14}$ Lussecs (under leakage-measuring conditions corresponding to the definition of the Lussec unit). The joint should provide an axial resistance which is equivalent to that of the standard cross section of the thin tube. Sealing tightness should be maintained under an axial load developing stresses equivalent to the limit elasticity of the thin tube. The joint should maintain nominal sealing tightness even after having undergone thermal shocks. No deterioration should occur in the joint during thermal cycling.

In its broad aspect the invention provides a method of making an end to end joint between two tubes in which one tube (herein called the thick tube) has at least at its end portion to be joined a wall thickness greater than that of the other tube (herein called the thin tube), the thin tube is formed with an external or internal flange or collar around its end to be joined to abut the end face of the thick tube, a sleeve is fitted outside or inside an end portion of the thick tube, which sleeve extends over the adjacent end portions of the thin tube and has a circumferential step which supports the flange or collar of the thin tube on the side remote from the thick tube. The sleeve is welded to the thick tube at a location longitudinally spaced from the end of that tube and the thickness of the walls of the thick tube is mechanically reduced between the weld and the end of the tube thereby to effect differential endwise expansion of the thick tube and sleeve and to clamp the flange between the step and the end face of the thick tube.

More specifically the invention provides a method of making a sealing tight joint between two tubular members made of different materials, one of which has thin walls, thinner than the other characterized in that the thin tube has a collar at one of its ends and the other tube (herein called the thick tube) has a thickened portion at its end, its end face being formed with a circumferential groove into which the collar of the thin tube can be seated. A thick sleeve which is of dimensions such that it slides on the thick tube and which is made of a material having a coefficient of thermal expansion close to that of the thick tube is formed at one of its ends with an internal flange having a thickness of the order of that of the end portion of the thick tube and a cross section matching that of the inside of the collar of the thin tube. This internal flange is brought into free abutment against the collar. The other end of the thick sleeve is then welded to the thick tube, whereafter the thickened portion is expanded by a tube expander, a support being used to prevent the assembly from being deformed radially during expansion.

The invention will be better understood with reference to the accompanying drawing, which shows a section taken along an axial plane through the tubes to be connected.

The drawing shows a first tube 1—the thick tube—and a thin-walled tube 2—the thin tube —made of a different material from the thick tube 1. The two tubes 1, 2 are to be connected to one another via a sealing tight joint meeting predetermined conditions. To this end, the tube 1 which is not necessarily thicker than tube 2, is formed adjacent the joint with a thickened portion 3, and the end face of the tube 1 is formed with a circumferential groove 4. The end of the tube 2 is formed by any known method with a flange or collar 5. In the drawing the collar is C-shaped, but can have any other shape, it may be Z-shaped or U-shaped, for example, it being however important that the cross sections of the groove 4 and the collar 5 are compatible with one another.

A sleeve 6 made of a material having a coefficient of thermal expansion substantially the same as that of the tube 1 and having an internal flange 7, has an internal diameter such that the sleeve 6 can be fitted over the tube 1 by a sliding fit. The flange 7 has a shaped face or step 8 compatible with the cross section of the groove 4 and the collar 5.

To produce the sealing tight joint, the sleeve 6 is so introduced that its flange 7, or more precisely its face 8, comes into free abutment against the inside surface of the collar 5 and the groove 4—i.e., with a clearance of the order of 1/10 of a millimeter.

The tube 1 and the sleeve 6 are then welded at 9 without prestress in either. The assembly is then mounted in a support 10 and the thickened portion 3 is expanded by a tube-expander roller, as 11, thus producing an axial elongation of portion 3 relative to sieeve 6 which pressurizes the different members. The material of the thickened portion 3 is so elongated that the tube end and groove 4 move towards the right as shown in the drawing and compresses the collar 5 between the end and groove and the flange 7, which is itself forced to the right. Since the weld 9 retains the left-hand end of the sleeve (as viewed in FIG. 1) in place, the sleeve is elongated and put into a stressed condition. The collar 5 is thus retained firmly in place between the groove and the flange, thus achieving satisfactory sealing tightness. The sleeve 6 is preferably of considerably axial length, so that the collar can be tightened in a satisfactorily controllable manner, and a reserve of resilient deformation can be stored which is made available without the joint being thermomechanically stressed. The prestressing produced by the mechanical expansion may be such that the sealing pressure is unloaded only when the temperature of the whole internal member drops by a value of the order of 50° C. This therefore ensures that the joint behaves very satisfactorily when subjected to thermal shocks.

The joint according to the invention raises no problem as regards enlargement of the thin tube, since it keeps the internal diameter without change. The method according to the invention enables tubes of cold-worked zircaloy to be used.

Another advantage afforded by the invention is that the collar 5 can be produced by a very simple adaptation of the machine for expanding the thickened portion 3, and this feature further simplifies the method disclosed hereinbefore.

The invention disclosed hereinbefore is not limited to the embodiment illustrated in the drawing, for instance, instead of being on the outside of the tube 2, the collar can be on its inside, without exceeding the scope of the invention. In that case the sleeve 6 is inside the tube 1, while the thickened portion 3 is on the outside thereof, the supports 10 being inside; the result is a joint in which the external surfaces of the tubes to be connected are in the prolongation of each other, in contrast with that described above in which the bore is constant.

We claim:

1. A method of making an end-to-end joint between two tubes in which one tube (herein called the thick tube) has at least at its end portion to be joined a wall thickness greater than that of the other tube (herein called the thin tube), comprising:
   a. forming the thin tube with a collar around the end to be joined to abut the end face of the thick tube,
   b. fitting a sleeve on an end portion of the thick tube, which sleeve extends over the adjacent end portion of the think tube and has a circumferential step which supports the collar on the side remote from the thick tube,
   c. welding the sleeve to the thick tube at a location longitudinally spaced from the end of that tube,
   d. working the metal between the weld and the end of the tube thereby to reduce mechanically the thickness of the walls of the thick tube to effect differential endwise expansion of the thick tube and sleeve and to clamp the collar between the step and the end face of the thick tube.

2. A method as claimed in claim 1 in which the end face of the thick tube is formed with at least one circumferential groove and the circumferential step is of corresponding shape to clamp collar against the groove.

3. A method of making a sealing tight joint between two tubular members made of different materials one of which has walls thinner than the other, comprising:
   a. forming a collar on the thin tube at one of its ends,
   b. forming on the other tube a thickened portion with a groove at its end,
   c. introducing said collar into said groove,
   d. forming a sleeve which is of such dimensions that it will slide on said other tube and has a coefficient of thermal expansion close to that of said other tube with a flange having a thickness and a cross section similar to said thickened portion and groove,
   e. placing said sleeve over said two tubes in end-to-end abutment so that said flange engages said collar,
   f. welding the end of said sleeve remote from said flange to said other tube,
   g. expanding said thickened portion axially while supporting it against radial deformation.

4. A method as set forth in claim 3, characterized in that the collar is produced by the same method and on the same machine as the expansion of the thickened portion.